United States Patent [19]

Dreyer et al.

[11] Patent Number: 4,491,144
[45] Date of Patent: Jan. 1, 1985

[54] FLEXIBLE SEALS FOR SLIDING BLADE DAMPERS

[76] Inventors: Paul L. Dreyer, 608 Elm Rd., Allentown, Pa. 18104; Russell F. Rarick, 215 E. Mifflin St., Orwigsburg, Pa. 17961

[21] Appl. No.: 512,013

[22] Filed: Jul. 8, 1983

[51] Int. Cl.³ .................. F16K 3/02; F16K 3/312
[52] U.S. Cl. .................. 137/240; 138/94.3; 126/285 A; 251/174; 251/328
[58] Field of Search .......... 251/328, 174; 137/240; 138/94.3; 126/285 A

[56] References Cited
U.S. PATENT DOCUMENTS 3,504,883  4/1970  Beck
4,088,146  5/1978  Hagar
4,093,245  6/1978  Connor
4,176,673  12/1979 Connor
4,334,550  6/1982  Connor Primary Examiner—Arnold Rosenthal
Attorney, Agent, or Firm—Sutherland, Asbill & Brennan

[57] ABSTRACT

A sliding blade damper is provided with an improved seal arrangement around the blade withdrawal aperture. Two pairs of flexible sealing strips are used, mounted on either side of the aperture and pressing against the opposite sides of the blade. The unattached edges of the sealing strips are curled and bent away from the blade. The curled edges of one pair of strips hook the curled edges of the other pair, so that when the blade is inserted into the damper, the spreading apart of the first pair of strips serves to partially spread apart of the second pair as well. In this manner the leading edge of the blade penetrates between the second pair of strips rather easily, lessening the chances that those strips will be bent or torn.

14 Claims, 9 Drawing Figures

FLEXIBLE SEALS FOR SLIDING BLADE DAMPERS

This invention concerns sliding blade dampers—in particular, means for sealing the apertures through which the blades slide.

Sliding blade dampers, somtimes called guillotine dampers, are used to control the flow of fluid in a conduit, for example the flow of flue gas in a fossil-fueled power plant. These dampers usually comprise a housing having a fluid flow opening therethrough and an elongated aperture in its wall; a substantially flat blade adapted for sliding movement through the aperture between an open position, wherein the blade is withdrawn from the housing, and a closed position, wherein the blade extends through the aperture and into the housing to restrict the flow of fluid through the housing; and means for sealing the aperture when the blade is withdrawn completely from the housing. The sealing means serve to reduce leakage of the fluid passing through the damper when the blade is withdrawn completely from the housing. In some cases, as, for example, when an air-purged seal is used, leakeage may be reduced to zero. An example of this type of damper is disclosed in U.S. Pat. No. 4,176,673 to Connor.

The present invention resides in an improved design of the means for sealing the blade aperture in the type of damper described. The design is comprised of (a) a first pair of opposed, flexible, elongated sealing strips, each strip's cross-section containing a curve that ends in a reverse-direction curl; each strip being fastened in sealing engagement to the housing by the long edge opposite the curled edge along a line adjacent to one of the long sides of the aperture, the curled long edge of each strip being unattached; said strips being so oriented that their unattached long edges extend outwardly from the housing with the curls opening toward one another, and the convex portions of the strips press against the opposite sides of the blade (in sealing engagement therewith) when the blade extends through the aperture, and press against one another (also in sealing engagement) when the blade is withdrawn completely from the housing; (b) an antechamber structure sealed to the housing over the blade aperture to contain any fluid that escapes past the first pair of sealing strips, said structure having an elongated aperture in it that is in registry with the blade aperture in the housing, so as to permit sliding movement of the blade through the antechamber structure as it is slid in or out of the housing; and (c) a second pair of opposed, felxible, elongated sealing strips, each second strip's cross-section containing a curve that ends in a same-direction curl; each of said second strips being fastened in sealing engagement to the antechamber structure by the long edge opposite the curled edge along a line adjacent to one of the long sides of the structure's aperture, the curled long edge of the strip being unattached; said second pair of strips being so oriented that their unattached long edges extend toward the housing with the curls opening away from one another, their curved portions press against the opposite sides of the blade (in sealing engagement therewith) when the blade extends through the aperture, and press against one another (also in sealing engagement) when the blade is withdrawn completely from the structure, and their unattached long edges are positioned inside the curls of the unattached long edges of the first pair of strips. By virtue of this new sealing means design, when the blade is being inserted into the housing, and as the blade's leading edge is forced between the second pair of strips, causing them to spread apart, the unattached long edges of the second strips engage the curled long edges of the first strips and push the latter away from one another, thereby facilitating the subsequent penetration by the blade between the first pair of strips as it is slid into the housing. This greater ease of inserting the withdrawn blade into the housing provides a decided advantage over prior art seals such as those disclosed in U.S. Pat. No. 4,176,673 to Connor, principally because it reduces the incidence of seal damage.

The elongated (preferably rectangular) metal strips employed in the damper of the present invention can be formed of any metallic stock which will provide a surface for seating against the face of the blade and which will resist corrosion in the environment of use and withstand the temperatures of use. Spring tempered metal is preferred, e.g., shim stock of steel or other alloy. The metal strip should be made of material that is heavy enough to hold up under repeated opening and closing of the seal, yet thin enough, for example about 0.005 to 0.02 inch, to conform to slight irregularities in the surface of the blade.

The first pair of sealing strips are fastened to the housing, on either side of the blade aperture, by any means that will provide a fluid-tight seal between the strips and the housing. As stated above, each of these first pair of sealing strips is curved, so that, in cross-section, from the point where it is fastened to the housing, the strip bulges toward the aperture, and then curls back on itself at its unattached long edge. Stated otherwise, the strip is substantially S-shaped in cross-section. The curved, or convex, portions of the first strips provide the sealing contacts. They press against the opposite sides of the blade when it protrudes through the aperture, and they press against each other when the blade is removed. The curled, unattached edges of the first pair of sealing strips are preferably so bent and so dimentioned that they are further away from the aperture than the convex portion is, and they do not touch the blade at any time during operation of the damper.

The particular configuration of the antechamber structure that is sealed to the housing over the blade aperture is not critical. As stated, the structure serves to contain any fluid that leaks past the first pair of seals. The antechamber structure also contains an elongated aperture, in registry with the housing's aperture, to receive the blade. The principal function of the second pair of sealing strips is to prevent further leakage of any fluid that gets past the first set of seals and into the antechamber. Preferably the antechamber is connected to a source of pressurized purging gas, for example air. In that manner any apertures there might be in the seal at the first pair of sealing strips will be plugged by the out-rushing purge gas, rather than let the lower pressure conduit gas leak through. Air purging is especially desirable in dampers that are used to shut off flue gas going to a scrubber. Scrubbers frequently require maintenance that can only be performed by a worker entering the scrubber while the flue gas is rerouted to an alternate scrubber. Since a worker in the confined space of the scrubber is separated from the concentrated, poisonous flue gas only by the closed damper, it is imperative that the damper not allow any of the flue gas to leak past it. Air-purging around all four edges of the damper blade ensures against such leakage.

The second pair of sealing strips, as stated above, are fastened to the antechamber structure along both long sides of the structure's aperture. One strip is mounted on each long side of the aperture, just as in the case of the first pair of strips. Any means of fastening will suffice that provides a fluid-tight seal between the strips and the antechamber structure. Whereas the first pair of strips reach outwardly from the housing, the second pair of strips extend inwardly, toward the housing. In other words, the two pairs of strips reach toward one another.

Each of the second pair of strips is also curved in cross-section. Again, the line of the curve is convex, bulging towards the antechamber structure's aperture. The unattached long edge of each second strip is also curled, but the direction of its curl is a continuation of the main curve of the strip. Thus the curls of the second pair of strips open away from one another, while the curls of the first strips open toward one another.

The convex portions of the second pair of strips provide the sealing contacts, just as the convex portions of the first pair do. The convex portions press against the opposite sides of the blade when it is between the strips. When the blade is completely removed from the housing, including the antechamber, the second pair of strips press against each other at their convex portions, to seal the antechamber to the atmosphere. Preferably, each seal's curve is partially flattened, so that the flat portion is the part that presses against the side of the blade. The outwardly turned curls of the second pair of sealing strips normally rest inside the inwardly turned curls of the first pair of strips.

To provide the desired degree of pressure between the sealing strips that bear against one another, flexible back-up strips, e.g., of the same material, can be used to support the sealing strips. The back-up strip will ordinarily be narrower than the sealing strip and will press against the side of the sealing strip that does not come in contact with the blade.

A specific embodiment of the present invention, showing our present contemplation of the best mode of carrying it out, is depicted in the attached drawings.

Figure 2:
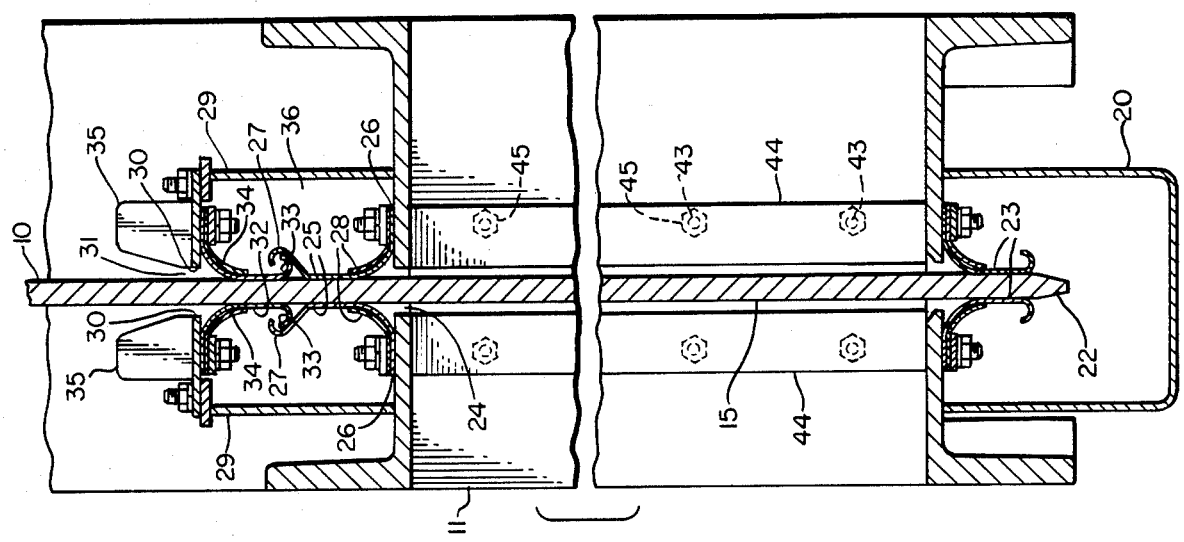
FIG. 2 is an enlarged side view, along line 2—2, partially in cross-section and partially broken away, of the damper depicted in FIG. 1.

Referring in more detail to FIGS. 1, 2, 3, 7, and 9, blade 10 is there shown fully inserted in housing 11. Between side edge 12 of blade 10 and interior wall 13 of housing 11, when in the damper-closed position, is a void space 14 (see FIG. 7). Void space 14 is separated from the upstream face 15 of blade 10 by the seal assembly indicated generally by reference numeral 16, and is separated from the downstream face 17 of blade 10 by the seal assembly indicated generally by reference numeral 18. Openings 19 near the bottom of housing 11 (see FIGS. 1 and 9) serve to connect void space 14 with air duct 20, which is supplied with purge air by fan 21.

At the bottom of housing 11, as shown in FIG. 2, the forward edge 22 of blade 10 protrudes between transverse spring sealing strips 23, which are J shaped in cross-section and are biased against the upstream and downstream faces, 15 and 17, respectively, of blade 10. Seals 23, which are made of flexible shim stock, e.g., about 0.01 inch thick, and the blade's leading edge 22 are enclosed within air duct 20.

At the top of housing 11, blade 10 protrudes through blade withdrawal aperture 24, which is sealed by a first pair of transverse sealing strips 25. In cross-section each sealing strip 25 resembles a crude letter S. Each strip 25 is fastened in sealing engagement to housing 11 by one of its long edges 26. The opposite long edges 27 end in curls that open toward one another. Back-up strips 28 are mounted on top of sealing strips 25 to help press the strips against blade 10.

A pair of transverse support members 29 is welded to the top of housing 11 to provide an antechamber structure 36 over blade withdrawal aperture 24. Between the facing edges 30 of support members 29 lies a second blade withdrawal aperture 31. On top of each support member 29 is a series of guide members 35 that help guide blade 10 into aperture 31. (See FIG. 4).

Along edges 30 of the antechamber structure are fastened a second pair of opposed, flexible, curved sealing strips 32. The unattached long edges 33 of sealing strips 32 end in curls that open away from one another. Back-up strips 34 help press sealing strips 32 toward one another.

Figure 5:
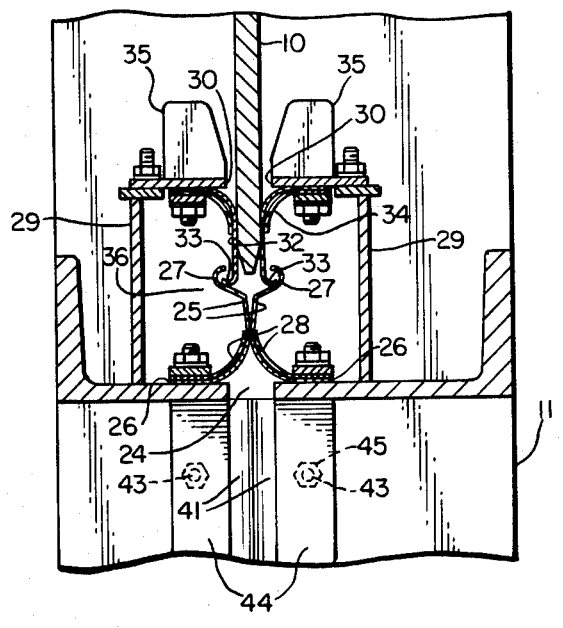
FIG. 5 depicts the top seal assembly in FIG. 2, but with the blade partially inserted into the damper's antechamber.
Figure 6:
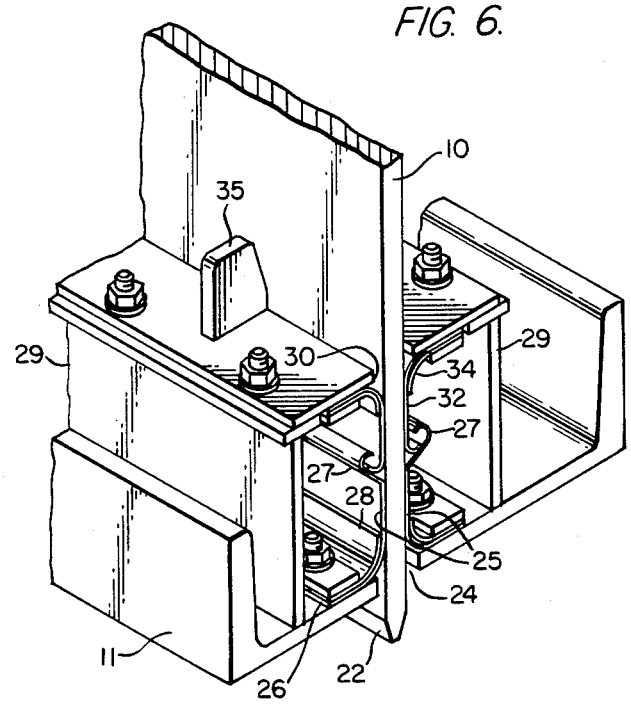
FIG. 6 is an isometric view of the top seal assembly depicted in FIGS. 2, 4 and 5, but with the blade inserted through the damper's antechamber and protruding part way into the fluid flow opening in the housing.

The curled edges 33 of sealing strips 32 are positioned inside the curled edges 27 of sealing strips 25. Consequently, as shown in FIG. 5, when blade 10 is inserted into housing 11, and as its leading edge 22 is forced between strips 32, causing them to spread apart, edges 33 of strips 32 engage edges 27 of strips 25 and push strips 25 away from one another. The partial spreading apart of strips 25 makes it easier for blade 10 to penetrate between them as it is slid into housing 11.

Figure 1:
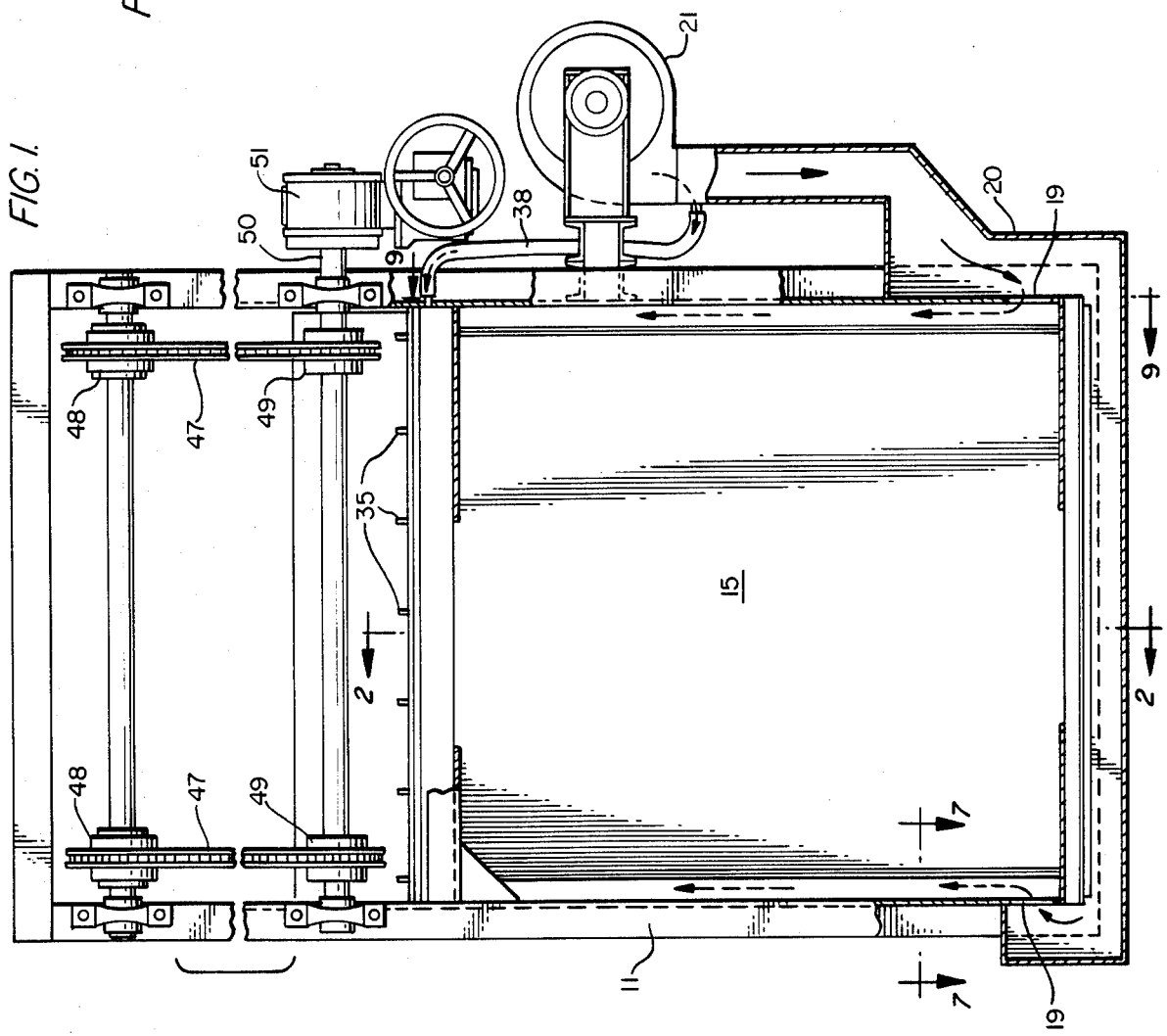
FIG. 1 is a front view, partially broken away and partially in cross-section, of a guillotine damper of the present invention in the closed position.
Figure 3:
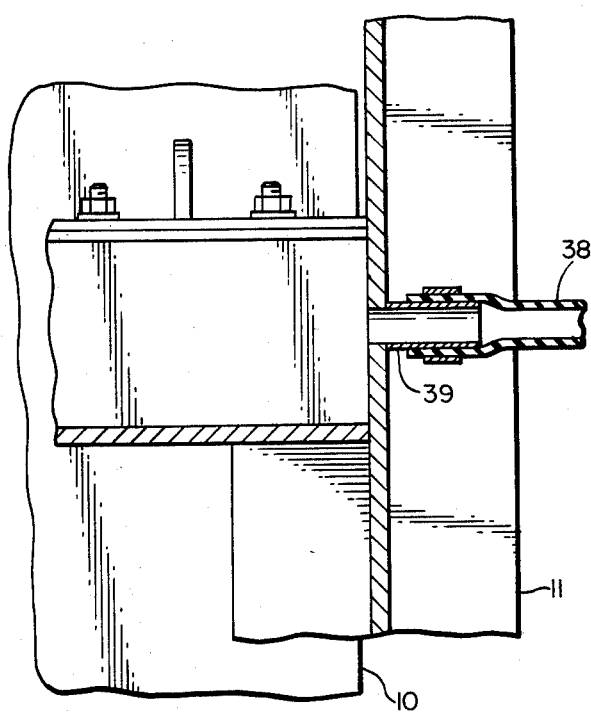
FIG. 3 is a front view, along line 3—3 of FIG. 2, of the right-hand portion of the top seal assembly of the damper depicted in FIGS. 1 and 2.
Figure 9:
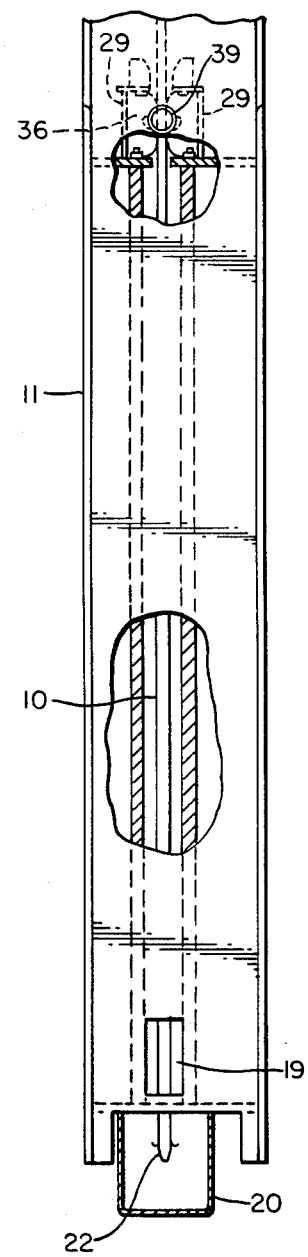
FIG. 9 is an enlarged side view along line 9—9 in FIG. 1, partially broken away, of the damper depicted in FIGS. 1 through 8.

As shown in FIGS. 1, 3, and 9, the antechamber 36 that is formed by support members 29 is in communication with inlet pipe 39, which is supplied with purge air by fan 21 and duct 38. When the damper is in the closed position the air pressure in antechamber 36 is kept higher than the gas pressure on the upstream side of blade 10. In that manner if there are any openings in the seal between strips 25 and blade 10, or between strips 32 and blade 10, they will be plugged by outrushing air.

Figure 7:
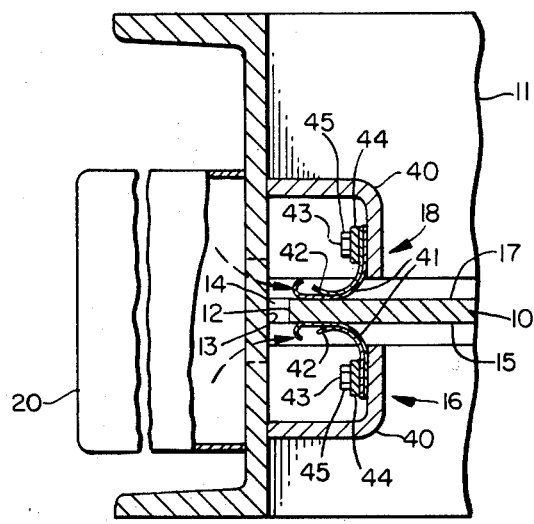
FIG. 7 is a top view, along line 7—7 of FIG. 2, of the side seal assembly of the damper depicted in FIGS. 1 through 6.
Figure 8:
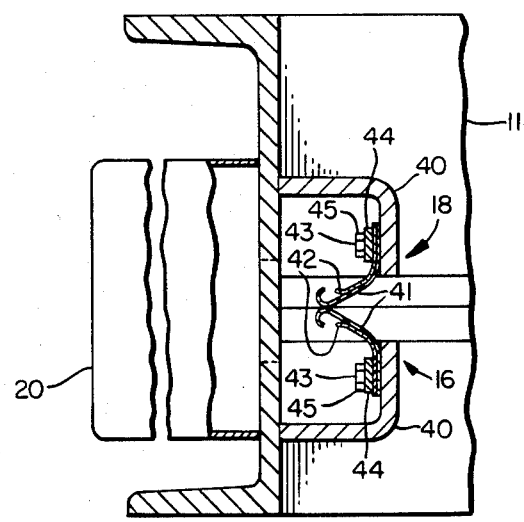
FIG. 8 depicts the side seal assembly of FIG. 7, but in the open position.

As shown in FIGS. 7 and 8, each of the side seal assemblies 16 and 18 is comprised of a piece of angle iron 40 welded to the inside wall of housing 11 and carrying a bent sealing strip 41 and a back-up strip 42 to give strip 41 some added support. Strips 41 and 42 are substantially identical to strips 32 and 34 at aperture 31 between support structures 29. Each pair of strips 41 and 42 fits over a row of threaded studs 43 and is held in place by hold-down plate 44 and nuts 45.

With regard to the side sealing strips 41, when blade 10 is closed and the air purge fan 21 is operating so as to create an air pressure within void space 14 which is greater than the gas pressure adjacent the faces, 15 and 17, of gate 10, then the higher pressure air will steadily escape void space 14 through any openings that might exist between sealing strips 41 and blade 10, thereby preventing the leakage of gas around the edges of blade 10. In the same manner the high pressure air in duct 20 prevents the leakage of conduit gas around the bottom edge 22 of blade 10. Suitable mitering means, not illustrated in the drawings, because not essential to an understanding of the present invention, should be provided at each of the four corners of housing 11 to join together, in effect, the horizontal and the vertical sealing strips, and thus provide one continuous seal around the inside perimeter of housing 11.

Referring to FIG. 1, the raising and lowering of blade 10 is made possible by endless chains 47, which are attached by pendant rings (not shown) to the top of blade 10 and which pass around upper sprockets 48 and lower sprockets 49. Lower sprockets 49 are turned by drive shaft 50, which in turn is driven through gear reduction box 51.

Figure 4:
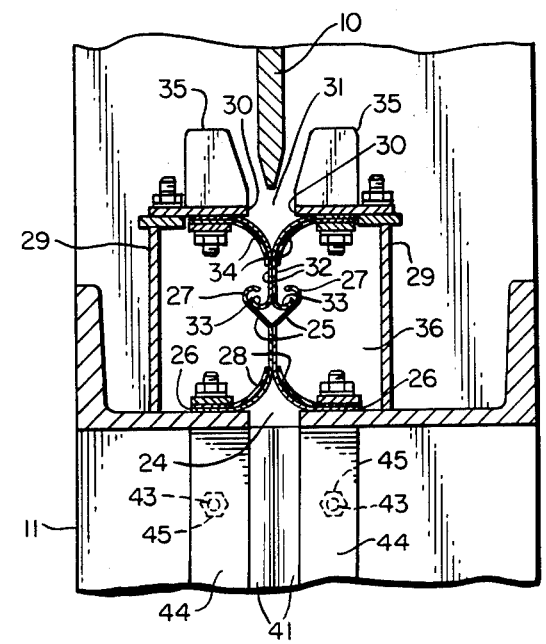
FIG. 4 depicts the top seal assembly in FIG. 2, but with the blade completely withdrawn from the damper housing.

When, as shown in FIG. 4, blade 10 is withdrawn completely from housing 11, for instance for servicing, sealing strips 25 come together, as do strips 32, thereby sealing the conduit from the atmosphere. Similarly, although not shown in the drawings, bottom transverse sealing strips 23 are urged together upon withdrawal of blade 10. In the same manner, side sealing strips 41 close upon one another when blade 10 is withdrawn from housing 11. Preferably, purge fan 21 will run continuously, whether blade 10 is in the open or closed position, to at all times prevent the escape of any conduit gases to the atmosphere, either through apertures 24 and 31 or via the route through pipe 39, duct 38, and fan 21.

We claim:

1. In a sliding blade damper comprising
a housing having a fluid flow opening therethrough and an elongated aperture in its wall;
a substantially flat blade adapted for sliding movement through the aperture between an open position, wherein the blade is withdrawn from the housing, and a closed position, wherein the blade extends through the aperture and into the housing to restrict the flow of fluid through the housing;
and means for sealing the aperture when the blade is withdrawn completely from the housing,
the improvement wherein the sealing means comprise (a) a first pair of opposed, flexible, elongated sealing strips, each strip's cross-section containing a curve that ends in a reverse-direction curl; each strip being fastened in sealing engagement to the housing by the long edge opposite the curled edge along a line adjacent to one of the long sides of the aperture, the curled long edge of each strip being unattached; said strips being so oriented that their unattached long edges extend outwardly from the housing with the curls opening toward one another, and the curved portions of the strips press against the opposite sides of the blade (in sealing engagement therewith) when the blade extends through the aperture, and press against one another (also in sealing engagement) when the blade is withdrawn completely from the housing; (b) an antechamber structure sealed to the housing over the blade aperture to contain any fluid that escapes past the first pair of sealing strips, said structure having an elongated aperture in it that is in registry with the blade aperture in the housing, so as to permit sliding movement of the blade through the antechamber structure as it is slid in or out of the housing; and (c) a second pair of opposed, flexible, elongated sealing strips, each second strip's cross-section containing a curve that ends in a same-direction curl; each of said second strips being fastened in sealing engagement to the antechamber structure by the long edge opposite the curled edge along a line adjacent to one of the long sides of the structure's aperture, the curled long edge of the strip being unattached; said second pair of strips being so oriented that their unattached long edges extend toward the housing with the curls opening away from one another, their curved portions press against the opposite sides of the blade (in sealing engagement therewith) when the blade extends through the aperture, and press against one another (also in sealing engagement) when the blade is withdrawn completely from the structure, and their unattached long edges are positioned inside the curls of the unattached long edges of the first pair of strips, so that when the blade is being inserted into the housing, and as the blade's leading edge is forced between the second pair of strips, causing them to spread apart, the unattached long edges of said second strips will engage the curled long edges of the first strips and push the latter away from one another, thereby facilitating the subsequent penetration by the blade between the first pair of strips as it is slid into the housing.

2. The sliding blade damper of claim 1 wherein the damper is equipped with means for supplying purge gas to the interior of the antechamber structure.

3. The sliding blade damper of claim 1 wherein at least one of the sealing strips is supported by a flexible back-up strip that presses against the side of the sealing strip that does not come in contact with the blade.

4. The sliding blade damper of claim 2 wherein at least one of the sealing strips is supported by a flexible back-up strip that presses against the side of the sealing strip that does not come in contact with the blade.

5. The sliding blade damper of claim 1 wherein the first pair of sealing strips' cross-section contains a partially flattened curve, the flat portion of which is the part that presses against the side of the blade.

6. The sliding blade damper of claim 2 wherein the first pair of sealing strips' cross-section contains a partially flattened curve, the flat portion of which is the part that presses against the side of the blade.

7. The sliding blade damper of claim 3 wherein the first pair of sealing strips' cross-section contains a partially flattened curve, the flat portion of which is the part that presses against the side of the blade.

8. The sliding blade damper of claim 4 wherein the first pair of sealing strips' cross-section contains a partially flattened curve, the flat portion of which is the part that presses against the side of the blade.

9. The sliding blade damper of claim 1 wherein each of the four sealing strips is supported by a flexible back-up strip that presses against the side of the sealing strip that does not come in contact with the blade.

10. The sliding blade damper of claim 2 wherein each of the four sealing strips is supported by a flexible back-up strip that presses against the side of the sealing strip that does not come in contact with the blade.

11. The sliding blade damper of claim 1 wherein each of the four sealing strips' cross-section contains a partially flattened curve, the flat portion of which is the part that presses against the side of the blade.

12. The sliding blade damper of claim 2 wherein each of the four sealing strips' cross-section contains a partially flattened curve, the flat portion of which is the part that presses against the side of the blade.

13. The sliding blade damper of claim 9 wherein each of the four sealing strips' cross-section contains a partially flattened curve, the flat portion of which is the part that presses against the side of the blade.

14. The sliding blade damper of claim 10 wherein each of the four sealing strips' cross-section contains a partially flattened curve, that flat portion of which is the part that presses against the side of the blade.

* * * * *